UNITED STATES PATENT OFFICE.

BENJAMIN H. DOSENBACH, OF BUTTE, MONTANA; EDNA M. DOSENBACH EXECUTRIX OF SAID BENJAMIN H. DOSENBACH, DECEASED, ASSIGNOR TO EDNA M. DOSENBACH.

ORE CONCENTRATION.

1,350,364. Specification of Letters Patent. Patented Aug. 24, 1920.

No Drawing. Application filed November 16, 1917. Serial No. 202,266.

*To all whom it may concern:*

Be it known that I, BENJAMIN H. DOSENBACH, a citizen of the United States, residing at Butte, in the county of Silver Bow and State of Montana, have invented certain new and useful Improvements in Ore Concentration, of which the following is a specification.

My invention is an improvement in that method of concentrating ores wherein the desired part of the ore is separated from the remainder by subjecting the ore pulp to the action of bubbles of gas.

In a method of procedure in common use the ore pulp, consisting of ground ore held in suspension in water, is subjected to the action of gas in a vessel provided with a porous bottom being composed of any suitable material, such as canvas or other fabric suitably supported, unglazed earthenware, or other porous material. As heretofore practised some suitable reagent such as an oil, coal or wood tar or derivatives thereof, amyl alcohol or other alcohols, hydroxy compounds and so forth, has been mixed with the pulp. The various reagents above mentioned are generally spoken of collectively as "oils" for want of a better generic term, although many of the substances used are not, properly speaking, oils. I shall herein refer to these substances as modifying agents, this term also being in common use, the reagents having the effect of bringing about such modification of the forces involved as to promote selection of the desired particles by the bubbles and to give the bubbles themselves sufficient longevity to permit of the separation of the mineral collected by them.

It has heretofore been discovered that it is unnecessary to mix the modifying agent with the mass of solids and water composing the ore pulp and a method of concentration has been devised wherein the modifying agent in gaseous form and generally mixed with air or other inert gas is introduced through the porous medium at the bottom of the cell containing the pulp. The gaseous modifying agent may be either the vapor of a substance which does not exist in the gaseous form at ordinary temperatures and pressures or the gaseous modifying agent may be a substance which does assume the gaseous form under normal conditions. For instance, by passing the air current supplied to the porous bottom cell over or through a body of oil such as pine oil, sufficient of the oil becomes vaporized and mixed with the air current to bring about the necessary modifying action and effect concentration of the ore. Other substances which are normally in the gaseous form at ordinary temperatures and pressures are also effective when mixed with the air supplied to the porous bottom cell to bring about efficient concentration. Among such substances are the gases distilled from various hydrocarbon and other organic substances such as bituminous materials occurring in nature, including asphalt, gilsonite, coal, especially bituminous coal, and numerous other materials.

When the modifying gas is obtained by simple distillation or by destructive distillation or steam distillation of organic or other substances the distilled gases may contain, and ordinarily do contain a mixture of different gaseous substances condensing at different degrees of temperature and pressure, some of the constituents being soluble in water and some insoluble, and when the gaseous modifying agent is obtained by simply passing the air current through or over a liquid modifying agent the same is true, depending, of course, upon the composition of the liquid modifying agent used.

I have discovered that the efficiency of concentration is affected by the amount and character of modifying gases carried in the air current.

It is common in the manufacture of illuminating and fuel gas such as coal gas, carbureted water gas, etc., to subject the gas originally formed to various treatments for the purpose of eliminating undesirable ingredients and increasing the proportion of ingredients that contribute to the use to be made of the gas. I have found that the properties of the gases originally formed, whether by simply bringing air in contact with a liquid modifying agent or by subjecting some solid or liquid substance to distillation, can be improved for concentration purposes by subsequent treatment in some respects analogous to the treatment of ordinary illuminating and fuel gases, but obviously the properties desirable in illuminating and fuel gas are not in all respects identical with those necessary or desirable in concentration operations. I have found that gas for concentration purposes, like illuminating or fuel gas, is improved by the removal therefrom of readily condensable substances, and that for concentration purposes ingredients soluble in water in some instances contribute little, if anything, to the final result. By the phrase "readily condensable substances" I refer to such gaseous substances as assume the liquid or solid state at the temperatures and pressures prevailing in concentration operations, which I shall term normal temperatures and pressures. On the other hand, the presence of other compounds undesirable in illuminating gas appears to exercise no deleterious effect in concentration operations. My investigations indicate that if the gases originally formed be freed from readily condensable substances and in some instances from substances soluble in water an improvement in the results is brought about. Readily condensable substances are undesirable for the reason that they condense upon the porous medium through which the gas mixture is introduced into the pulp, thus eventually leading to the medium becoming clogged, and such readily condensable substances and soluble substances to the extent that they go into solution in the pulp are the cause of irregularity in operaion, especially in those instances where the water is separated from the tailings and returned to the head of the mill, that is, where the mill is operated upon a closed water circuit. In such instances the repeated charging of the water with soluble substances not only involves the waste of the substances so going into solution, but renders regulation of the operations less certain by reason of the charging of the water with varying and increasing amounts of dissolved matter. The soluble ingredients in the vaporized oil or gaseous modifying agent appear in some instances to contribute nothing to the efficiency of the concentration operation, as I have ascertained by a comparison of the results obtained by the use of oleic acid, an oil which is almost completely insoluble, and pine oil which contains an appreciable amount of soluble ingredients. Not only are the results obtained by the use of vapors of oleic acid and vaporized pine oil substantially the same, but I have found by tests upon the ore of the Butte and Superior Mining Company's mine at Butte, Montana, and other ores that the soluble ingredients of pine oil contribute nothing to the efficiency of the concentration obtained by the use of vaporized pine oil. I have digested pine oil with water until all of the soluble ingredients were dissolved and by this means have eliminated from the pine oil all of the water soluble portion. The insoluble residue of pine oil when vaporized and mixed with air brought about as efficient concentration as vapors from the original pine oil containing the soluble ingredients. By eliminating the soluble ingredients of the oil or using an oil originally prepared free of soluble ingredients the waste of substances available for other purposes and the contamination of the mill water is avoided.

The soluble ingredients may be removed from the modifying agent either by treatment of the oil, as above described, with water, to dissolve out the soluble ingredients, or the vapors or gases produced by distillation, destructive or otherwise, of solid and liquid substances may be treated to a scrubbing operation as commonly used in the manufacture of illuminating gas. Scrubbers for this purpose are old and well known in the gas manufacturing art and need no detailed description here. They consist merely of various devices for bringing about a large area of contact between the gas and water. Such contact is sometimes effected in towers filled with twigs, pebbles or other loosely packing substances over which water is allowed to trickle from the top while the gas is admitted at the bottom and discharged at the top, during its passage coming in contact with the water trickling down over the solid substance contained in the tower. Mechanical devices are also used for the same purpose, these mechanical devices generally consisting of grids revolving in vertical planes and dipping in water at their lower edges, thereby becoming covered with a sheet of water, and the gas passing through the vessel containing the grids comes in contact with the large water surface thus formed. In all of these various devices the soluble ingredients of the gas are dissolved by the water and the gas discharged is almost completely free of water soluble substances. For removing the readily condensable constituents of the gas ordinary condensers such as used in gas manufacture, cooled by water, air or otherwise, may be used.

I have found that the removal of the readily condensable ingredients and the water soluble substances constitutes sufficient preparation of the modifying gas for concentration purposes, many other ingredients which are found more or less deleterious in gas used for other purposes not interfering to any appreciable extent, if at all, with the use of the gas as a modifying agent.

Sulfur dioxid, for instance, has in instances been found advantageous in flotation operations especially in the treatment of ores containing several metals which it is desirable to separate, such as iron, lead and zinc in the form of sulfids, the sulfur dioxid having the effect of preventing the flotation of one or more of the metallic sulfids. This preventive action being temporary the metal not recovered in the first flotation operation may be separated from the gangue by a subsequent treatment.

In the claims I use the expression "modifying gas" to indicate the gas or vapor which has the effect of bringing about or promoting the selective action of the bubbles whereby certain constituents of the ore adhere to the bubbles and other constituents do not and the further effect of imparting some degree of persistence to the bubbles. In this use of the term "modifying gas" I merely distinguish from inert gases such as air, or other gases which may be used in admixture with the modifying gas merely for the purpose of contributing to the bulk of the gaseous medium and forming an agency of buoyancy. I also refer in some of the claims to the step of "generating" a modifying gas, thereby including not only the formation of a modifying gas by vaporization or distillation, but also the formation of a modifying gas by any suitable or economical means such as the formation of the gas by chemical reaction.

The precise degree to which it is necessary that the modifying gas be free of soluble and condensable ingredients is a matter dependent upon the nature of the ore, the character of the mill operations, the extent to which the mill water is returned to the head of the mill and the character of the modifying gas, including the properties deleterious or otherwise of the soluble and condensable constituents thereof. Condensable substances of a viscous or tarry character, such as some of the ingredients of gases distilled from organic matter, such as coal, asphaltic substances, gilsonite, wood, etc., have a tendency to close the pores of the porous medium through which the gas is introduced into the pulp, and while some water soluble substances are harmful and render exact regulation of the conditions of operation difficult or impossible other water soluble substances appear to be inert and merely to lead to waste of substances that might otherwise be useful.

What I claim is:

1. In a process of concentrating ores the operations of subjecting a modifying agent to the solvent action of water to remove water soluble matter therefrom, introducing the remainder of said agent in the gaseous state into an ore pulp thereby effecting flotation of certain constituents of the ore, and separating the floated constituents from the remainder of the ore.

2. In a process of concentrating ores the operations of subjecting a gaseous modifying agent to the solvent action of water to remove water soluble matter therefrom, introducing the remainder of said agent into an ore pulp thereby effecting flotation of certain constituents of the ore, and separating the floated constituents from the remainder of the ore.

3. In a process of concentrating ores the operations of introducing into an ore pulp a modifying gas containing substantially no water soluble ingredients, thereby effecting flotation of certain constituents of the ore, and separating the floated constituents from the remainder of the ore.

4. In a process of concentrating ores the operations of generating a gas containing a modifying substance, removing from said gas substantially all of the water soluble constituents, introducing the substantially insoluble part of the gas into an ore pulp, thereby effecting flotation of certain constituents of the ore, and separating the floated constituents from the remainder of the ore.

5. In a process of concentrating ores the operations of subjecting a modifying gas to a predetermined temperature and thereby condensing part of said gas, introducing the uncondensed part of said gas into an ore pulp, thereby effecting flotation of certain constituents of the ore, and separating the floated constituents from the remainder of the ore.

6. In a process of concentrating ores the operations of introducing into an ore pulp a modifying gas containing substantially no ingredients condensable to liquid or solid form at normal temperatures and pressures, thereby effecting flotation of certain constituents of the ore, and separating the floated constituents from the remainder of the ore.

7. In a process of concentrating ores the operations of generating a gas containing a modifying substance, removing from said gas substantially all of the ingredients that are condensable to liquid or solid form at normal temperatures and pressures, introducing the non-condensable part of the gas into an ore pulp, thereby effecting flotation of certain constituents of the ore, and separating the floated constituents from the remainder of the ore.

8. In a process of concentrating ores the operations of subjecting a gaseous modifying agent to a predetermined temperature to condense parts thereof and to the solvent action of water, introducing the uncondensed and undissolved part of said agent into an ore pulp thereby effecting flotation of certain constituents of the ore, and separating the floated constituents from the remainder of the ore.

9. In a process of concentrating ores the operations of introducing into an ore pulp a modifying gas containing substantially no water soluble ingredients or ingredients condensable to liquid or solid form at normal temperatures and pressures, thereby effecting flotation of certain constituents of the ore, and separating the floated constituents from the remainder of the ore.

10. In a process of concentrating ores the operations of generating a gas containing a modifying substance, removing from said gas substantially all of the ingredients which are either soluble in water or condensable to liquid or condensable to solid form at normal temperatures and pressures, introducing the insoluble and non-condensable part of the gas into an ore pulp, thereby effecting flotation of certain constituents of the ore, and separating the floated constituents from the remainder of the ore.

11. In a process of concentrating ores the operations of introducing into an ore pulp gas distilled from gilsonite thereby effecting flotation of part of the constituents of the ore, and separating the floated constituents from the remainder of the ore.

In testimony whereof I have subscribed my name.

BENJAMIN H. DOSENBACH.